G. E. CAMPBELL.
GRAIN SHOCKER.
APPLICATION FILED AUG. 1, 1912.
1,092,092. Patented Mar. 31, 1914.
5 SHEETS—SHEET 5.
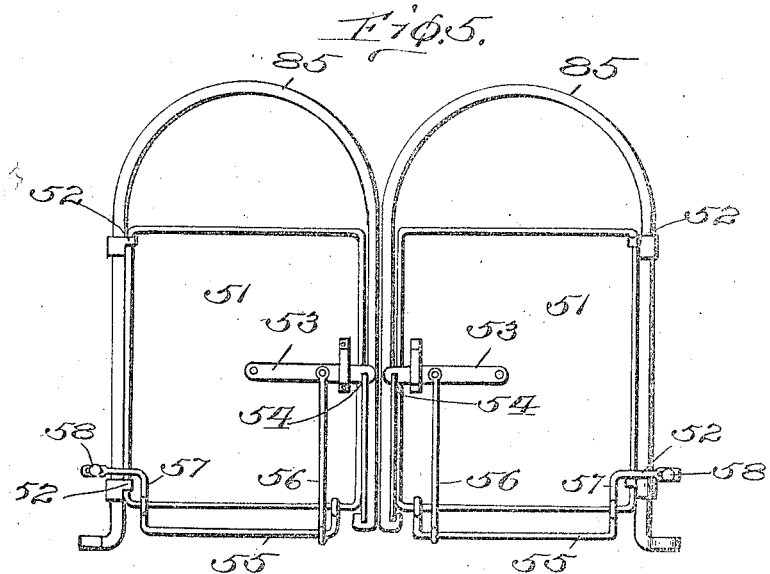
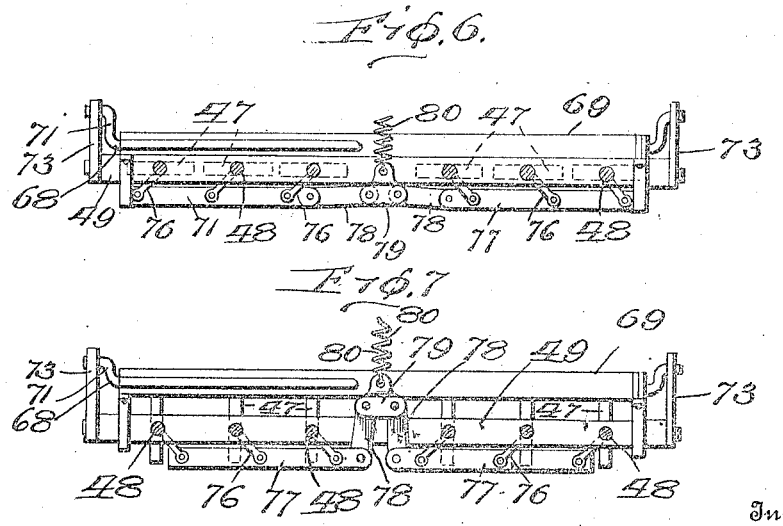

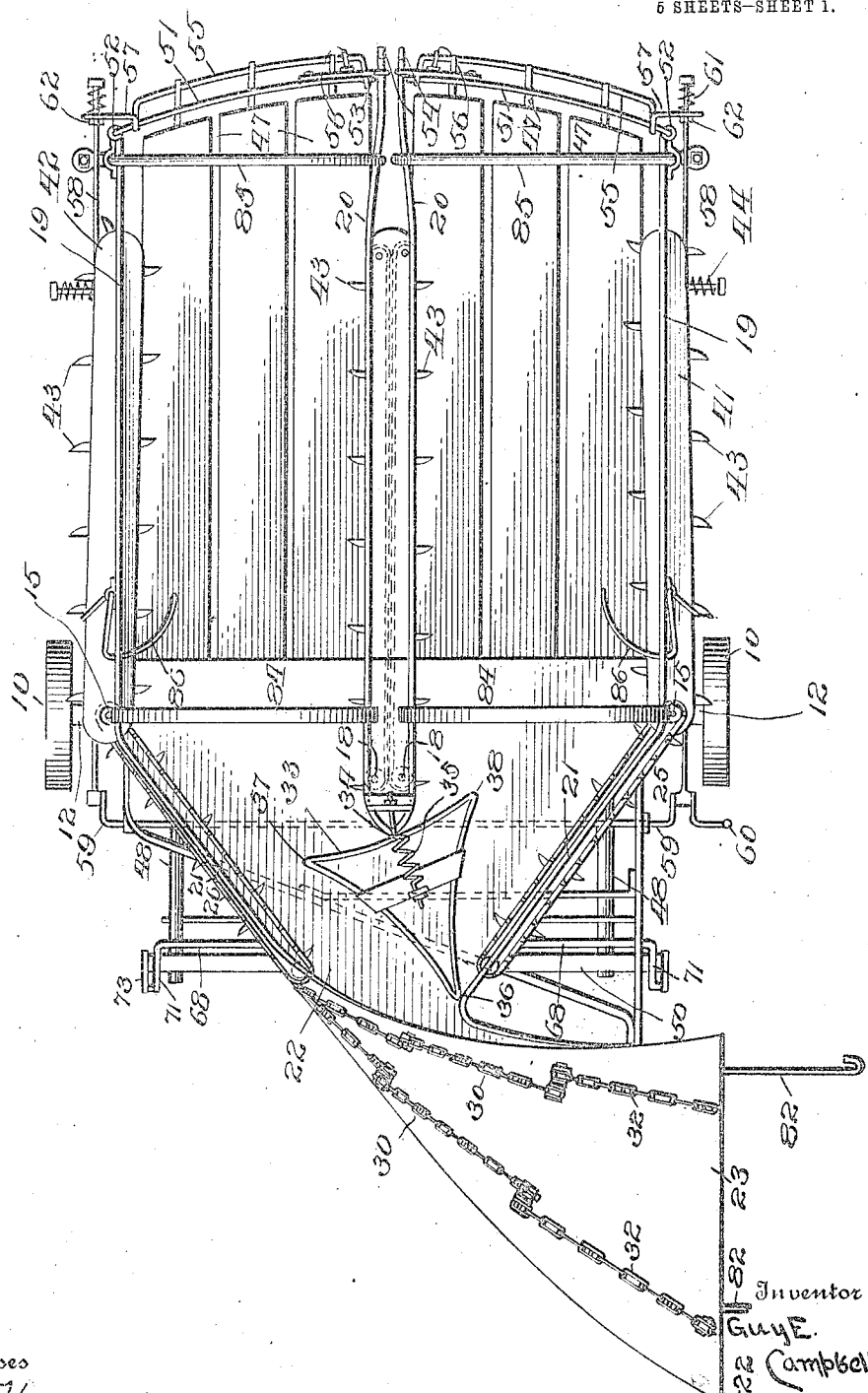

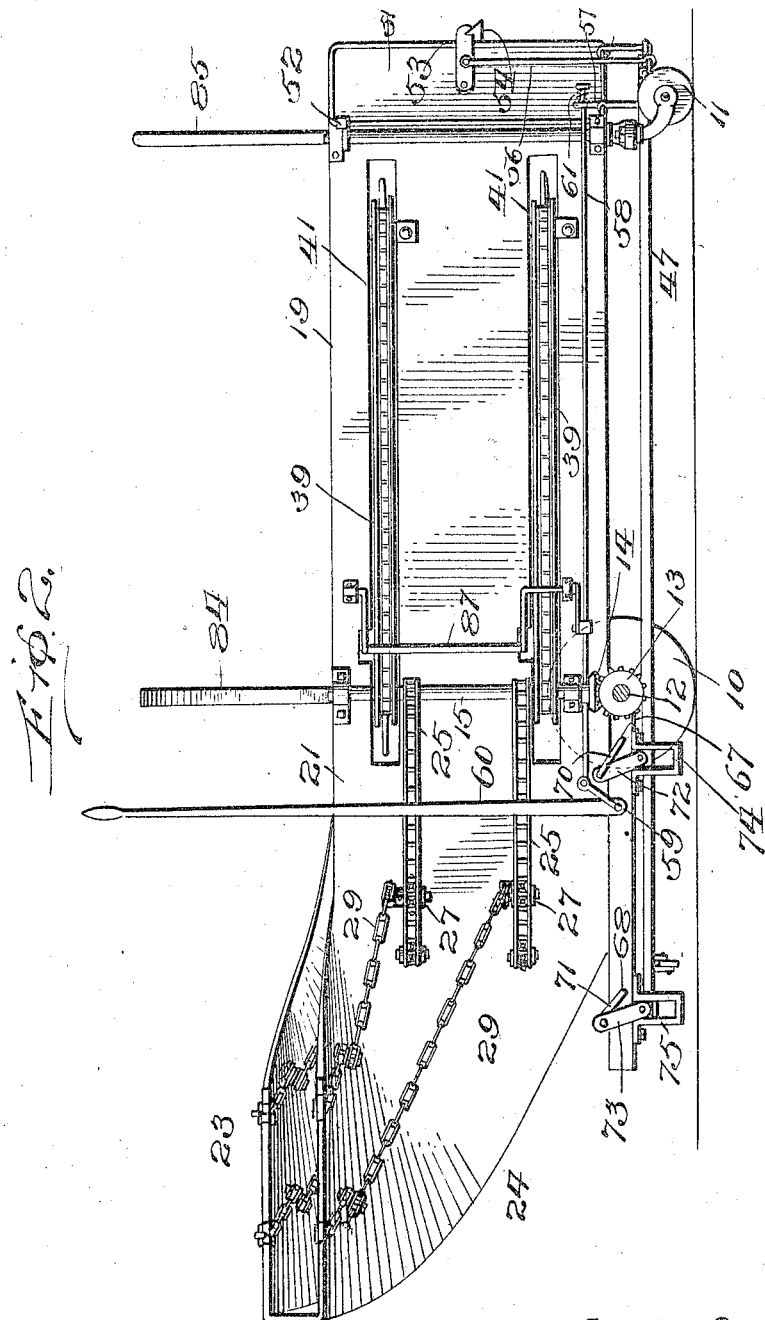

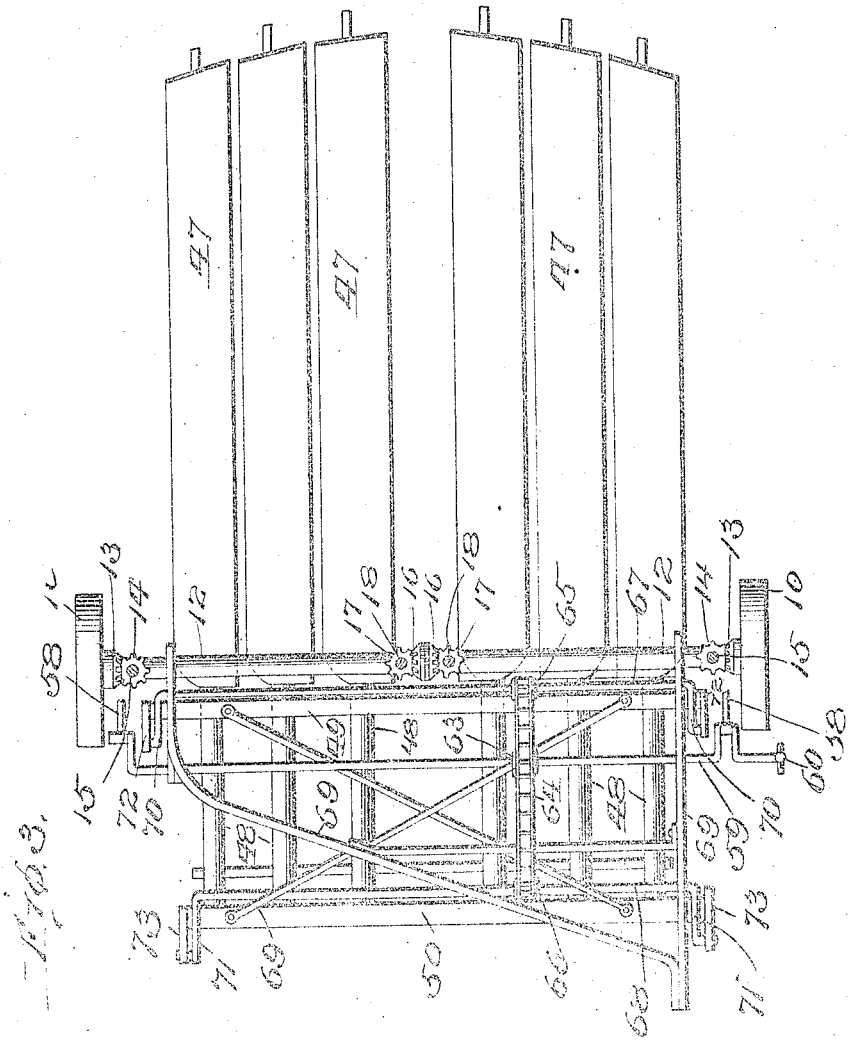

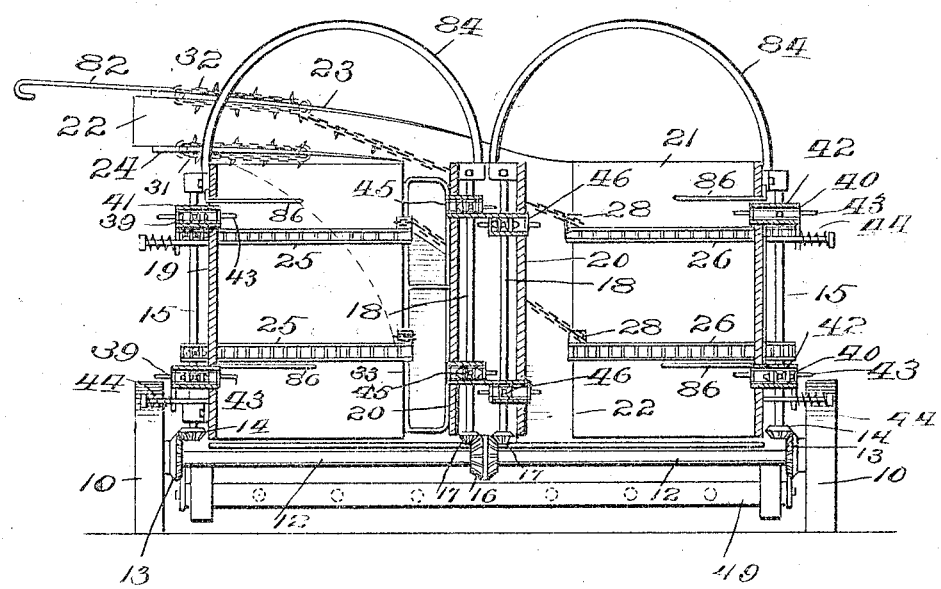

UNITED STATES PATENT OFFICE.

GUY E. CAMPBELL, OF GRAVITY, IOWA.

GRAIN-SHOCKER.

1,092,092.    Specification of Letters Patent.    Patented Mar. 31, 1914.

Application filed August 1, 1912. Serial No. 712,688.

*To all whom it may concern:*

Be it known that I, GUY E. CAMPBELL, a citizen of the United States, residing at Gravity, in the county of Taylor and State of Iowa, have invented certain new and useful Improvements in Grain-Shockers; and I do hereby declare the following to be a full, clear, and exact description of the invention, such as will enable others skilled in the art to which it appertains to make and use the same.

This invention relates to grain shockers and has for an object to provide a mechanism adapted to take sheaves of grain as delivered from an ordinary self binder, turn the sheaves to standing position and assemble them in proper relation to be later delivered upon the ground in such standing relation in the form of a shock.

A further object of the invention is to provide a mechanism adapted to be attached at the delivery end of the binder and to be drawn along at the side of and wholly in the rear of such delivery end embodying a chute positioned to receive a sheave from the delivery end of the binder and to transfer it to the structure drawn in the rear of the binder and simultaneously to change the sheave from horizontal to vertical position, and with mechanism for delivering from the mechanism the sheaves so conveyed.

A further object of the invention is to provide a structure embodying parallel adjacent compartments supported upon bearing wheels with means for delivering sheaves alternately into the said compartments in standing position and means for opening said compartments and permitting the sheaves to drop upon the ground and to withdraw the mechanism from about and under such sheaves in such standing position.

A further object of the invention is to provide adjacent compartments with supporting mechanism, each compartment being provided with a bottom composed of parallel adjacent strips pivotally mounted with means for dropping such bottom and simultaneously turning the strips on edge.

A further object of the invention is to provide parallel adjacent compartments having a bottom and rear end adapted to be opened for delivery, mechanism at the forward end of the compartments adapted to guide sheaves alternately into said compartments and a twisted conveyer chute terminating adjacent said guiding mechanism and provided with means for attaching to the delivery end of a binder.

A further object of the invention is to provide detail structure adapted to carry out the aforesaid general purposes.

With these and other objects in view the invention comprises certain novel constructions, combinations and arrangement of parts as will be hereinafter more fully described and claimed.

In the drawings:—Figure 1 is a top plan view of the improved shocker. Fig. 2 is a view of the shocker in side elevation seen from the side employed adjacent the binder. Fig. 3 is a top plan view of the substructure or bottom with the superstructure removed. Fig. 4 is a transverse sectional view through the shocker. Fig. 5 is a rear end elevation of the shocker. Fig. 6 is a detail view showing the operation of the bottom structure with the bottom raised in position to retain the sheaves. Fig. 7 is a detail view of the bottom structure showing the bottom dropped in delivery position. Fig. 8 is a diagrammatic view showing conventionally a binder of ordinary construction and in outline, the shocker attached thereto, the details being omitted, this view being intended only to show the position of the shocker relative to the binder.

Like characters of reference indicate corresponding parts throughout the several views.

The improved shocker which forms the subject matter of this application comprises a frame supported upon traction wheels 10 and casters 11. The traction wheels are mounted rigidly upon the shafts 12 from which the mechanism receives motion, such shafts being provided with spur gears 13 adjacent the traction wheels 10 intergeared with pinions 14 carried upon shafts 15 and with other gears 16 adjacent the middle of the structure intergeared with pinions 17 carried rigidly upon shafts 18. The shafts 15 and 18 are vertical and adjacent the forward end of the body and serve to transmit power to the several sprocket conveyer chains employed about the structure. The superstructure comprises sides 19 and center partitions 20, such center partitions being spaced apart to form a chamber between the two compartments which are formed respectively by the said center partitions 20 and the side walls 19.

At the forward end of the body and in front of the traction wheels 10 the side walls 19 converge as at 21 with a bottom 22 between such converging walls which is further reduced and twists to form the forward edge of the chute as shown at Figs. 1, 2, 4 and 8. The side walls 21 are also twisted, one forming the top of the chute shown at 23 and the other forming the bottom of the chute as shown at 24, such chute then being completed by the wall 22, top 23 and bottom 24 and adapted to be attached at the delivery end of a binder as shown particularly at Fig. 8 and in position to receive sheaves in a horizontal position when delivered from such binder and by reason of the twist as illustrated, to change such sheaves from a horizontal to a vertical position as they are moved down the chute. To insure the movement of the sheaves down the chute sprocket chains with fingers extending therefrom are mounted upon the chute and receive motion from the shafts 15. Such sprocket chains are employed in any desired number to accommodate the curvature of the chute and are shown as starting with chains 25 and 26 which extend along the converging walls 21 and receive motion directly from the shafts 15. The sprocket chains 25 and 26 pass respectively over sprockets 27 and 28 around which also pass other sprocket chains 29 and 30 which in turn respectively drive sprocket chains 31 and 32, the latter being upon the top of the chute and the former upon the bottom of the chute. As these sprocket chains are driven in series from the shafts 15 they tend to convey the sheaves delivered from the binder through the chute upon the floor 22, arriving in such latter position in standing or vertical position by reason of the twist of the chute.

At the forward ends of the walls 21 such walls converge and a guide 33 is pivotally connected therewith as at 34 and provided with a spring 35 by which the said frame is held yieldingly with its point 36 against either of the converging walls 21. With the frame shown in the position seen at Fig. 1 a sheave passing from the chute will be guided by the guide into the compartment seen at the top of Fig. 1 and at the same time by engaging against the point 37 will reverse the guide so that the next sheave passing therethrough will pass into the compartment seen at the lower side of Fig. 1 engaging against point 38 in passage and moving the guide back to the position shown in Fig. 1. By this arrangement it will be seen that the sheaves are delivered alternately into the two compartments and are delivered into said compartments by the sprocket chains 25 and 26.

Along the outer sides of the compartments sprocket chains 39 and 40 are mounted to move, driven from sprockets carried upon the shafts 15. The rear ends of the sprocket chains 39 and 40 are carried upon shafts which are journaled in frames 41 and 42 pivoted to swing upon the shafts 15 and held yieldingly with the fingers 43 extending within the compartments, such yielding engagement being provided by springs 44.

In the chamber between the center walls 20 sprocket chains 45 and 46 are also mounted to assist in moving the sheaves rearwardly, said sprocket chains also being provided with fingers 43 to engage the sheaves, such fingers 43 extending through the walls 20 into the compartments. It will therefore be seen that the sheaves passing down the chute will be turned to standing position and delivered alternately to the compartments and will be moved by the fingers 43 carried upon their respective sprocket chains rearwardly within such compartments.

To support the sheaves within the compartments a plurality of strips 47 extend longitudinally beneath the compartments and are provided with reduced portions 48 at their forward ends. The reduced portions 48 extend through the frame pieces 49 and 50 which form journal bearings permitting the said strips to rotate upon the reduced portion 48. The strips 47 are comparatively thin and flat so that when positioned in horizontal planes as indicated at Figs. 1, 2 and 3 they serve to support the sheaves standing within the compartments and when turned to occupy vertical planes as indicated at Fig. 7 they permit the butts of the sheaves to engage the stubble or ground underneath such strips and to be drawn by frictional engagement out of the compartments assisted by the always moving sprocket chains 39, 40, 45 and 46.

To retain the sheaves in the compartments until a sufficient number have been deposited therein to complete a shock, doors 51 are provided at the rear of such compartments hinged as at 52 at the rear of the side walls 19 and provided with latches 53 positioned to engage with keepers 54 to maintain the doors normally in closed position and to prevent the sheaves from escaping from the compartments. To open the doors at the times when the contained sheaves are to be released a bail 55 is pivoted upon each of said doors and a link 56 extends from such bail upwardly to the latches 53. It is necessary then only to raise the bails 55 whereupon the latches are raised out of engagement with the keepers 54 and the doors released. To accomplish such raising the bails 55 are provided with arms 57 through which extend rods 58 extending along the side of the machine and connected with crank arms carried upon a shaft 59. The shaft 59 is provided with a lever 60 by which the shaft 59 is manipulated to draw the rods 58 and unlatch the doors. The connection between the rods 58 and the arms 57 is made by means of springs 61 so that the first action of moving the lever 60 is to withdraw the bail 55 from under the pins carried by the strips 47 so that the strips fall. A continued movement of the lever 60 serves to raise the latch 53 by the link 56, which is followed by the swinging of the doors to open position. A collar 62 is provided rigidly upon the rods 58 by which a reverse movement of the lever tends to close the doors. The shaft 59 is also provided with a sprocket 63 over which passes a sprocket chain 64 engaging sprockets 65 and 66 rigidly mounted respectively upon shafts 67 and 68. The shafts 67 and 68 are journaled in the frame 69 which is carried upon the shafts 12 and said shafts are respectively provided with crank arms 70 and 71. The crank arms 70 and 71 are connected by links 72 and 73 respectively with the ends of the frame pieces 49 and 50 which carry the strips 47, such ends being mounted to slide vertically in the guides 74 and 75. It will be apparent, therefore, that as the lever 60 is manipulated to open the doors 51, through the medium of the sprocket chain 64 the shafts 67 and 68 will also be rotated to drop the strips 47, such strips being carried by the frame pieces 49 and 50 as above described.

To accomplish the rotation of the strips 47 to the position shown at Fig. 7 when the same are dropped the reduced portions 48 of such strips 47 are each provided with a crank arm 76 which said crank arms are pivotally connected with strips 77 so that as the strips 77 are moved the strips 47 are moved to horizontal or vertical planes as indicated at Figs. 6 and 7. To accomplish such movement the adjacent ends of the strips 77 are connected to links 78 which in turn are pivotally connected with a block 79 connected by a spring 80 to the frame 69. As the frame pieces 49 and 50 are dropped as above described the block 79 is supported practically against movement by the spring 80 which through the medium of the links 79 serves to draw together the strips 77 and turn the strips 47 to vertical planes as shown at Fig. 7 but when said bottom structure is raised by the return movement of the lever 60 the said strips are also returned to horizontal planes as indicated at Fig. 6.

To connect the device with the binder any approved couplings are provided dependent upon the make of binder to which the device is attached, such binders ordinarily being provided with a bearing sleeve 81 to which the device is connected by hook arms 82 and by such further connecting means as may be found necessary as for instance the bar 83. It is to be understood that the connecting means is dependent upon the structure to which the shocker is attached and may be varied at will.

To retain the frame and walls rigidly in their proper position arched members 84 at the front and 85 at the rear are provided. When the shock is being formed, a set of fingers 86 carried upon a rod 87 is thrown into the compartments to prevent the passage of any newly formed sheaves on to the strips 47 until the latter have been raised to loading positions. The rods extend through the walls 19 upon which they are pivoted, and are connected to rod 58, so that as the latter swings to open the doors 51, the fingers 86 are thrown into place, as shown in Fig. 1.

In operation, therefore, the device is attached to the binder in the manner described, as for instance as shown at Fig. 8, sheaves are delivered to the chute and are turned to vertical position and alternately guided to the two compartments and are moved by the sprocket chains to the rear of such compartments or as near the rear of the compartment as the filled condition of such compartment will permit. When the compartments have been sufficiently filled to constitute a shock the lever 60 is manipulated to drop the supporting members 47 and open the end doors which permits the standing sheaves to engage the stubble or ground and at the same time to be moved by the engaging side sprocket chains so that the structure is moved from the sheaves which are left stationary and standing in vertical position upon the ground. The return movement of the lever 60 returns the parts to receiving position which operation may be performed while the device is moving along in the regular course of cutting and binding the grain.

I claim:

1. In a shocker, a wheel-supported main frame, a housing comprising front and side walls carried by the frame; a movable auxiliary frame mounted on a rocker shaft carried by the housing, and arranged to be raised to, and lowered from the housing; slats pivotally mounted in the auxiliary frame and forming a bottom for the housing; crank arms carried by each of the slats; strips connecting the outer ends of said crank arms; links connecting the ends of the strips, and having their inner ends attached to a block connected to the main frame, whereby when said auxiliary frame is lowered the links will be drawn to substantially vertical position, and the inner ends of said strips made to approach each other, thus moving the slats to vertical position.

2. In a shocker, a wheel-supporting main frame, side walls carried by the main frame, said side walls converging in front of the forward supporting wheels and being deflected in a substantially continuous curve from a vertical to a horizontal position and inclined upwardly and outwardly to form the top and bottom of a chute, conveying means mounted along the side walls, conveying means substantially in line with the means first mentioned, and deflected to extend along the upwardly inclined walls, mechanism including a shaft for driving all of the conveying means and means for driving the shaft from the axle of the supporting wheels.

3. In a shocker, a wheel-supported main frame, side walls carried by the main frame, said walls converging at the front and being deflected from a vertical to a horizontal position and inclined upwardly and outwardly to form a top and bottom of a chute, conveying devices mounted along the side walls and the converging portions, means for dividing the space between the side walls, a pivoted guiding device between the converging portions of the side walls and adjacent to the end of the dividing means, the rear portion of the pivoted device projecting laterally on each side for engagement by a sheaf, causing said pivoted device to swing and guide alternate sheaves to opposite sides of the dividing means and into engagement with certain of the conveying devices, conveying devices positioned in the chute to move a sheaf from a horizontal position to a vertical position, permitting it to pass between the converging side walls, and mechanism for driving all of the conveying devices.

In testimony whereof I affix my signature in presence of two witnesses.

GUY E. CAMPBELL.

Witnesses:
 J. W. BANKS,
 L. T. REED.